Sept. 10, 1968  R. T. GAGE  3,400,974
DOUBLE ACTION HINGE
Filed Feb. 18, 1966  3 Sheets-Sheet 1

RAYMOND T. GAGE
INVENTOR
BY John R. Faulkner
John J. Roethel
ATTORNEYS

Sept. 10, 1968        R. T. GAGE        3,400,974
DOUBLE ACTION HINGE

Filed Feb. 18, 1966        3 Sheets-Sheet 2

RAYMOND T. GAGE
INVENTOR

BY John R. Faulkner
John J. Roethel
ATTORNEYS

Sept. 10, 1968    R. T. GAGE    3,400,974
DOUBLE ACTION HINGE
Filed Feb. 18, 1966    3 Sheets-Sheet 3

RAYMOND T. GAGE
INVENTOR

BY
ATTORNEYS

United States Patent Office 3,400,974
Patented Sept. 10, 1968

3,400,974
DOUBLE ACTION HINGE
Raymond T. Gage, Dearborn, Mich., assignor to Ford Motor Company, Dearborn, Mich., a corporation of Delaware
Filed Feb. 18, 1966, Ser. No. 528,641
10 Claims. (Cl. 296—146)

ABSTRACT OF THE DISCLOSURE

Two L-shaped hinge members have their longer legs hinged to each other, the shorter leg of one member pivoted to a vehicle body, and the shorter leg of the other member pivoted to a door. When the door is closed, the hinge axis of the longer legs lies approximately parallel to one side of the door and the door is opened by swinging movement about the hinge axis. In addition, the door can be bodily shifted out of the body opening by simultaneously turning the door about its pivot connection to the hinge and turning the hinge about its pivot connection to the body.

---

This invention relates generally to hinge construction and has particular reference to a hinge for supporting a door in a vehicle body opening for swinging movement and for bodily shiftable movement.

Bodies of station wagons and light trucks are usually provided with rear doors that either are hinged for swinging movement about a horizontal axis to a horizontal opened position or are hinged for swinging movement about a vertical axis to a substantially upstanding opened position. Each type of door has advantages and disadvantages related to the hinge axis about which it is swingable.

The door hinged for swinging movement about a horizontal axis has the advantage that it can be used as an extension of the cargo space and that the cargo space can be more easily loaded from a loading dock. It has the disadvantage that the door interferes with loading and unloading the cargo space from ground level. The door hinged for swinging movement about a vertical axis has the advantage that the cargo space is more easily loaded and unloaded from ground level, but the door requires a greater clearance radius and also blocks access to the vehicle opening from the side of the opening to which it is hinged.

In the present invention the advantages of both the horizontally and vertically hinged doors are attained by supporting the door in a vehicle body opening on a hinge constructed and arranged to provide for conventional swinging movement of the door about a horizontal hinge axis or for bodily shiftable movement of the door about vertical axes into and out of the body opening. This is accomplished by supporting the door in the body opening on at least one hinge comprising two hinge members pivotally connected to each other to provide a hinge axis. One of the hinge members is pivotally connected to the body and the other to the door. By the proper application of opening force on the door, either the door pivots about the hinge axis for swinging movement or the hinge pivots with respect to the body and the door pivots with respect to the hinge for bodily shiftable movement.

Supporting a door on a pair of the hinges of this invention so the hinge axes are coaxial with each other when the door is closed, the pivotal connections of the hinges to the body are parallel and the pivotal connections of the hinges to the door are also parallel, provides mutually exclusive swinging movement or bodily shiftable movement of the door. Pivotal connections of the hinge members to the body and the door are preferably the uniaxial type such as those formed by cylindrical elements. The use of uniaxial pivotal connections improves door stability.

Other objects and advantages of this invention will become apparent as this description proceeds, particularly when considered in connection with the accompanying drawings, wherein:

FIGURE 1 of the drawings is an exterior view of a vehicle body showing a rear door bodily shifted into a partially opened position;

Figure 1:
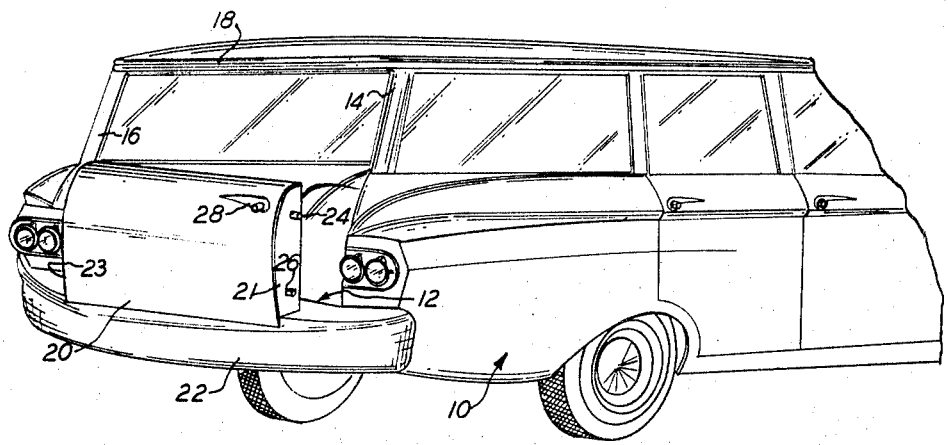

Referring primarily to FIGURE 1, a vehicle body 10 of the station wagon type has a rear opening defined by a lower sill 12, upstanding right and left side members 14 and 16 mounted on sill 12, and a roof 18 across the top of side members 14 and 16. A rear door or tailgate 20 is mounted to close a portion of the body opening. It will be understood that door 20 contains a retractable window operable in a conventional manner to fully close the body opening when door 20 is in its closed position. Door 20 has a right side 21 and a left side 23 that are adjacent side members 14 and 16, respectively, when door 20 is in its closed position. A rear bumper 22 is mounted on body 10 adjacent sill 12 below door 20. Right upper and lower latch bolts 24 and 26 are slidably mounted in side 21 of door 20.

Figure 2:
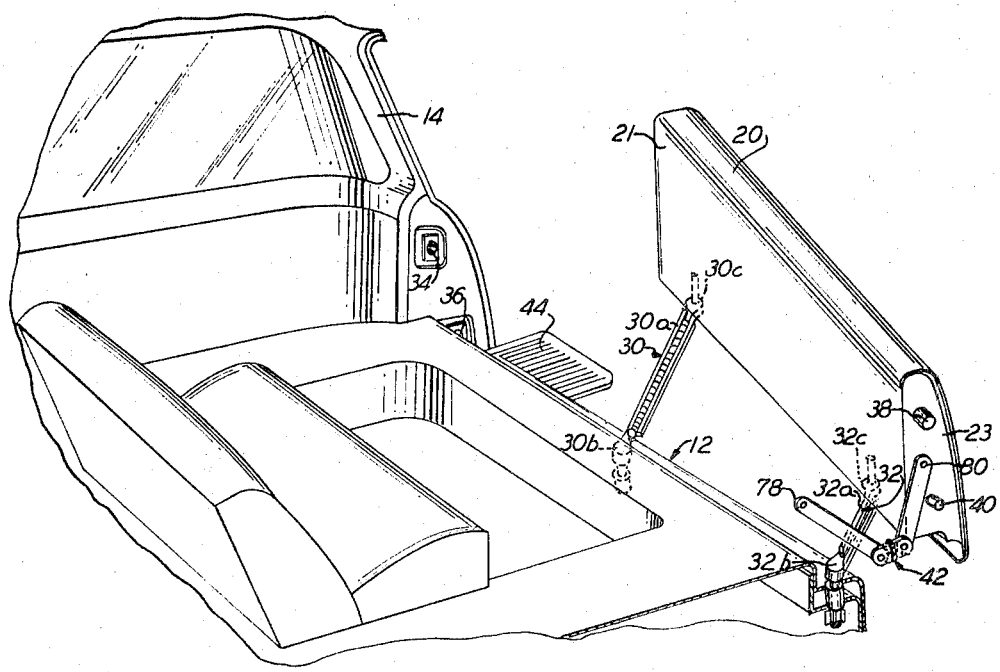
FIGURE 2 is an interior view of the rear door shown in FIGURE 1.

Door 20 is supported by right and left hinges 30 and 32 respectively (see FIGURE 2). Each hinge has an elongated center section 30a and 32a. Body pivots 30b and 32b are attached to one end of the respective center sections 30a and 32a and pivotally mount hinges 30 and 32 in sill 12. At the other end of center sections 30a and 32a, door pivots 30c and 32c are attached to the other end of the respective center sections 30a and 32a and pivotally engage the lower edge of door 20. Center section 30a is longer than center section 32a in the construction shown in the drawings to permit bodily shiftable movement of door 20 to an open position where door 20 is substantially normal to the plane of the body opening. In this position, door 20 does not interfere with direct access to the body opening.

Side member 14 has upper and lower latch plates 34 and 36 mounted therein to engage the respective latch bolts 24 and 26 when door 20 is in the closed position. Similarly, left side 23 of door 20 has left upper and lower latch bolts 38 and 40 slidably mounted therein to engage latch plates (not shown) mounted on side member 16. A door handle 28 is located on the outer surface of door 20. Handle 28 controls latch bolts 24, 26, 38 and 40 through conventional linkage (not shown). Also mounted on side 23 is one end of a strap hinge indicated generally by the numeral 42 which will be discussed in more detail with reference to FIGURE 5.

Figure 3:
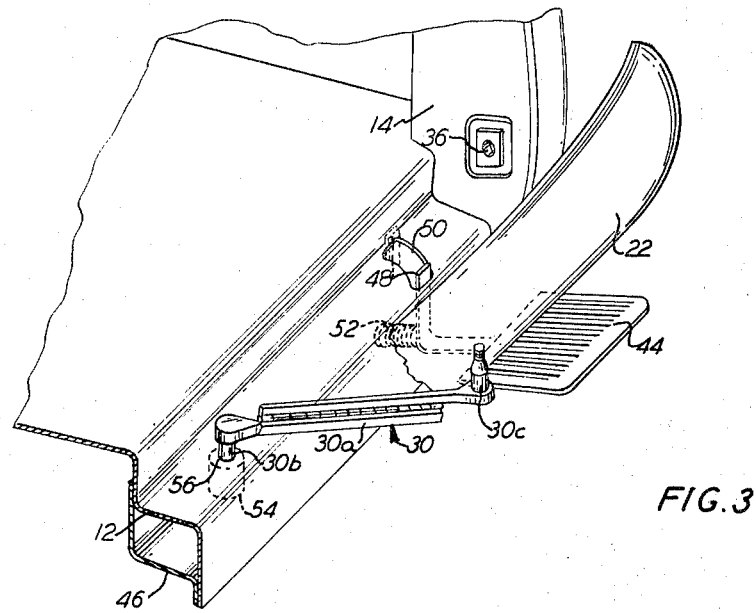
FIGURE 3 is a fragmentary view of a portion of the vehicle body with the door and one of the hinges removed.

Turning now to FIGURE 3, a step 44 is mounted below bumper 22 and projects horizontally a short distance beyond bumper 22. Step 44 is slidably mounted on a horizontal portion of a body member 46 that is positioned below sill 12 and forms a box section therewith. An upwardly extending tang 48 is attached to step 44 and extends through sill 12 adjacent side member 16. Tang 48 moves in a slot 50 cut into sill 12 and engages the lower side of door 20 when the latter is in its closed position. A spring 52 is mounted between sill 12 and a vertical portion of member 46 and engages tang 48 to urge the latter and step 44 outward.

Details of the mounting of hinge 30 to sill 12 are also shown in FIGURE 3. Hinge 32 has a similar construction and is mounted in a similar manner. A cylindrical member 54 is attached to the lower side of sill 12 by conventional means such as welding. A hole 56 extends through sill 12 and into member 54. Body pivot 30b is in the form of a cylinder which rotatably fits into hole 56, thereby permitting pivotal movement of hinge 30 about sill 12. Door pivot 30c has a construction similar to body pivot 30b and is attached to door 20 in a similar manner.

Figure 4:
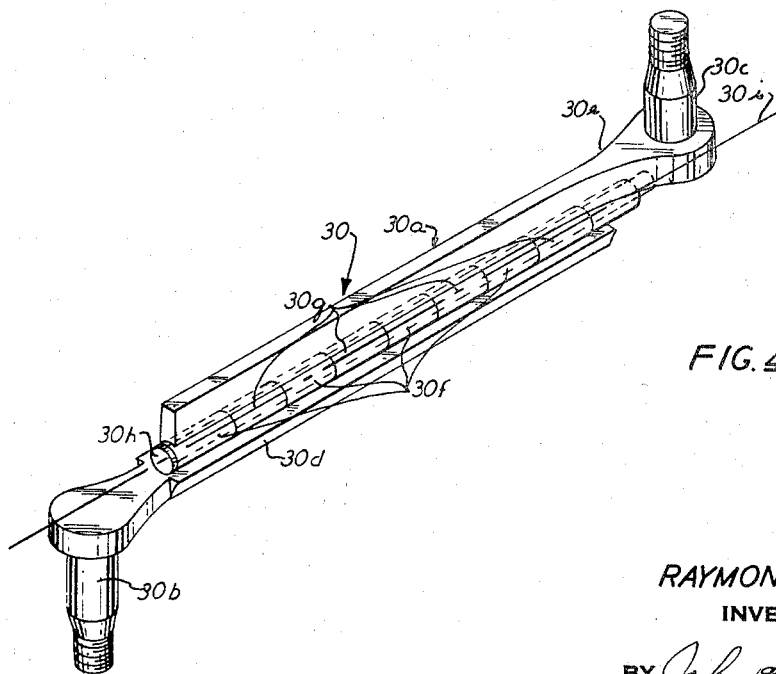
FIGURE 4 is an enlarged view of the hinge supporting the door.

FIGURE 4 shows details of the construction of hinge 30, it being understood that hinge 32 has the same construction except that center section 30a is longer than center section 32a. Hinge 30 comprises two L-shaped hinge members 30d and 30e. The short leg of member 30d includes body pivot 30b and the short leg of member 30e includes door pivot 30c. The long leg of hinge member 30d has a plurality of spaced hollow cylinders 30f along one edge and the long leg of member 30e has similarly spaced cylinders 30g adapted to mesh with cylinders 30f. When cylinders 30g and 30f are in meshing relationship, a bar 30h is inserted through the hollow portions of the cylinders, thereby forming a piano-type hinge along a portion of the long legs of members 30d and 30e. Bar 30h defines the hinge axis 30i of hinge 30.

Figure 5:
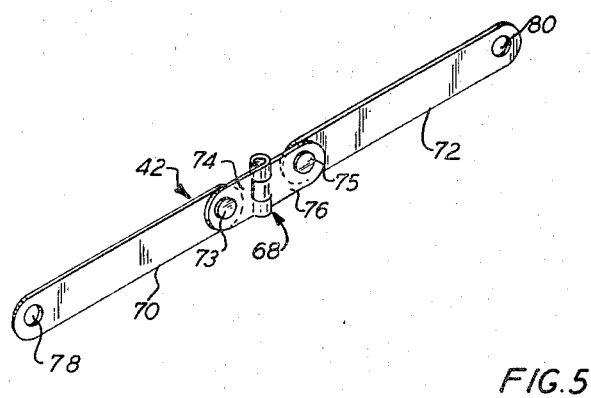
FIGURE 5 is an enlarged view of a strap hinge provided to limit maximum swinging movement of the door out of the body opening.

A detail of strap hinge 42 is shown in FIGURE 5. Strap hinge 42 comprises a middle section identified generally by the numeral 68 and two end sections 70 and 72. Middle section 68 comprises two portions 74 and 76 pivotally connected to each other. The other ends of portions 74 and 76 are pivotally connected to sections 70 and 72, respectively, by pivots 73 and 75. Pivots 73 and 75 form axes perpendicular to the pivotal axis formed by the connection of portion 74 to portion 76 and parallel to each other when portion 74 is aligned with portion 76. Holes 78 and 80 are drilled in the opposite ends of sections 70 and 72 parallel to pivots 73 and 75, respectively.

Figure 6:
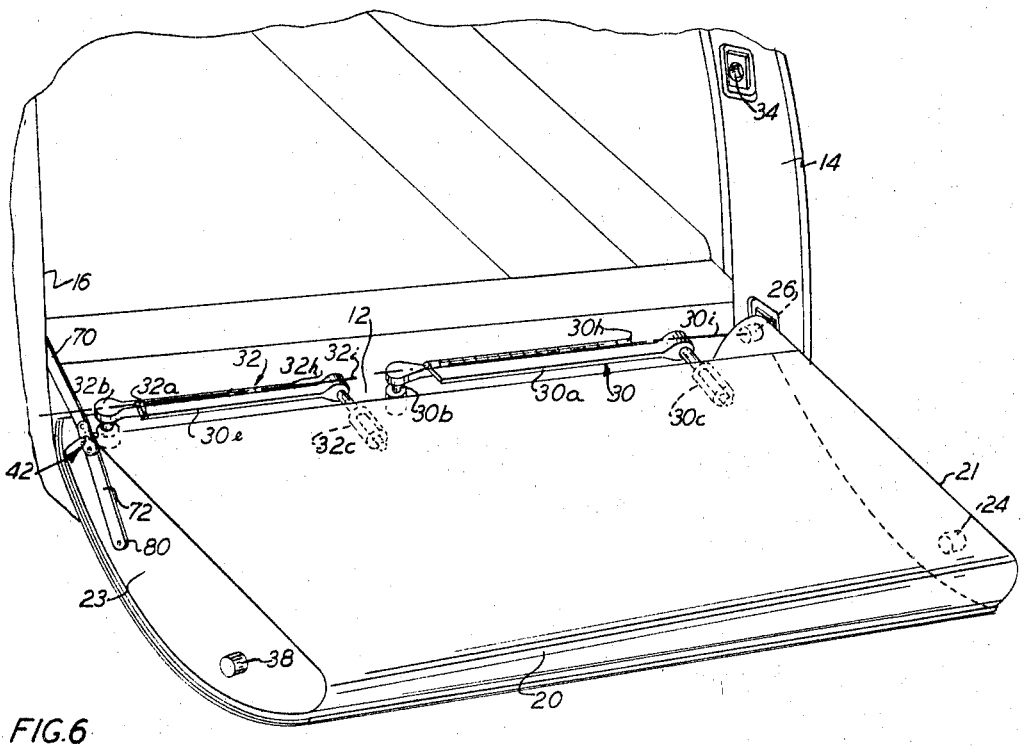
FIGURE 6 shows the door opened to a substantially horizontal position by swinging movement.

Referring now to FIGURE 6, hinges 30 and 32 are attached to door 20 and sill 12 so the hinge axis defined by bar 30h of hinge 30 and the corresponding bar 32h of hinge 32 are coaxial with each other and with the axes of latch bolts 26 and 40 when door 20 is in its closed position. Conventional pivots (not shown) attach strap hinge 42 to side member 16 through hole 78 and to side 23 through hole 80.

The operation of the hinges and the door will now be described with particular reference to FIGURES 2 and 6. To obtain the bodily shiftable movement shown in FIGURE 2, latch bolts 24, 26, 38 and 40 are released from engagement with their respective side members by any conventional means. An opening force applied to door 20 then shifts the latter out of the body opening by simultaneously pivoting door 20 about hinges 30 and 32 using pivots 30c and 32c, respectively, and pivoting hinges 30 and 32 about sill 12 using pivots 30b and 32b, respectively. Strap hinge 42 permits bodily shiftable movement by pivoting portion 76 relative to portion 74. Spring-loaded tang 48 assists in moving door 20 out of the body opening via bodily shiftable movement and at the same time pushes step 44 into a position where it can be conveniently used by passengers entering and leaving the body cargo space.

For swinging movement, lower latch bolts 26 and 40 are maintained in engagement with side members 14 and 16, respectively, while upper latch bolts 24 and 38 are released. Door 20 then pivots about the hinge axis formed by the coaxial relationship of bar 30h of hinge 30, the corresponding bar 32h of hinge 32, and latch bolts 26 and 40.

While latch bolts 24, 26, 38 and 40 improve the ease of selecting swingable or bodily shiftable movement of the door of this invention, they are not essential to door operation since proper application of the opening force can be used to select the desired movement. If desired, hinge members 30d and 30e (and the corresponding members of hinge 32) can be constructed so they are axially movable relative to each other for short distances, thereby permitting wider bodily shiftable movement of the door for hinges having the same center section length.

It is emphasized that the invention is not limited to the exact constructions shown or described but that changes and modifications can be made without departing from the spirit and scope of the invention as defined in the claims.

What is claimed is:

1. A hinge for mounting a door on a body for both swinging movement and bodily shiftable movement that comprises
    two hinge members pivotally connected to each other to provide a hinge axis for swinging movement of said door out of a body opening, and
    a body pivot means for connecting one of said hinge members to the body, and a door pivot means for connecting the other hinge member to the door to provide for bodily shiftable movement out of the body opening, the pivot axes of said pivot means being angled relative to said hinge axis.

2. The hinge of claim 1 in which each hinge member comprises a short leg and a long leg forming an L shape, the short leg of each member including said pivot means and the long legs being pivotally connected to each other to form the hinge axis.

3. The hinge of claim 2 in which each long leg comprises a plurality of spaced hollow cylinders connected thereto, the cylinders of one long leg being capable of meshing with the cylinders of the other long leg,
    said hinge comprising a bar passing through said cylinders when meshing with each other, said bar forming said hinge axis.

4. A vehicle body having an opening therein with a door closing at least a portion of said opening, said door being supported by the hinge defined in claim 1.

5. The body of claim 4 in which a sill member defines the lower edge of the body opening and the body pivot means is pivotally mounted in said sill member.

6. The body of claim 5 in which a second hinge constructed as defined assists in supporting said door, said second hinge being pivotally mounted in said sill member so the body pivot means of each hinge are parallel, and said second hinge being pivotally mounted to the door so the door pivot means are parallel, said hinge axes of said hinges being coaxial with each other when said door is mounted in its closed position.

7. The body of claim 6 in which a spring loaded step means engages said door to normally urge said door into bodily shiftable movement.

8. The body of claim 7 in which the distance between the body and the door pivot means of one hinge is greater than the corresponding distance of the other hinge.

9. The body of claim 8 in which the body pivot means and the door pivot means are uniaxial.

10. A vehicle body having an opening therein with a door closing at least a portion of said opening, said door being supported by the hinge defined in claim 3.

References Cited

UNITED STATES PATENTS

| | | | |
|---|---|---|---|
| 1,748,849 | 2/1930 | Schmidt | 49—246 X |
| 3,195,945 | 7/1965 | Barenyi | 49—253 |
| 1,769,979 | 7/1930 | Whittam | 49—253 |
| 3,313,063 | 4/1967 | Patin | 16—163 |
| 3,179,072 | 4/1965 | Coriell | 16—163 |
| 2,722,899 | 11/1955 | Brown | 16—163 |

PHILIP GOODMAN, *Primary Examiner.*